United States Patent
Wang et al.

(10) Patent No.: US 10,106,025 B2
(45) Date of Patent: Oct. 23, 2018

(54) HIGH VOLTAGE BATTERY COOLING PLENUM

(71) Applicant: FORD GLOBAL TECHNOLOGIES, LLC, Dearborn, MI (US)

(72) Inventors: LeeAnn Wang, Canton, MI (US); Hsiao-An Hsieh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 493 days.

(21) Appl. No.: 14/013,367

(22) Filed: Aug. 29, 2013

(65) Prior Publication Data
US 2015/0060164 A1 Mar. 5, 2015

(51) Int. Cl.
| | | |
|---|---|---|
| *B60K 6/405* | (2007.10) | |
| *H01M 10/625* | (2014.01) | |
| *H01M 10/6563* | (2014.01) | |
| *H01M 10/6566* | (2014.01) | |
| *H01M 10/613* | (2014.01) | |
| *B60K 1/00* | (2006.01) | |
| *B60K 1/04* | (2006.01) | |

(52) U.S. Cl.
CPC .......... *B60K 6/405* (2013.01); *H01M 10/613* (2015.04); *H01M 10/625* (2015.04); *H01M 10/6563* (2015.04); *H01M 10/6566* (2015.04); *B60K 2001/005* (2013.01); *B60K 2001/0416* (2013.01); *Y10S 903/952* (2013.01)

(58) Field of Classification Search
CPC ......... H01M 10/5016; H01M 10/5067; H01M 10/5073; H01M 2/1083; B60K 1/04; B60K 2001/005; B60L 11/1874; B60L 11/187; B60L 11/1877; B60L 11/1879; B60H 1/00278
See application file for complete search history.

(56) References Cited

U.S. PATENT DOCUMENTS

| | | | | |
|---|---|---|---|---|
| 4,947,735 | A * | 8/1990 | Guillemin | B60H 1/00071 454/141 |
| 6,085,854 | A * | 7/2000 | Nishikawa | 180/68.5 |
| 7,479,339 | B2 * | 1/2009 | Okazaki | B60K 1/04 180/65.31 |
| 7,635,040 | B2 * | 12/2009 | Seo et al. | 180/68.1 |
| 7,901,827 | B2 * | 3/2011 | Wang | H01M 8/04089 429/456 |
| 7,905,307 | B2 | 3/2011 | Kubota et al. | |
| 8,187,736 | B2 | 5/2012 | Park et al. | |
| 8,276,696 | B2 | 10/2012 | Lucas | |
| 9,067,486 | B2 * | 6/2015 | Janarthanam | H01M 10/625 |
| 2007/0102213 | A1 * | 5/2007 | Seo et al. | 180/68.1 |

(Continued)

FOREIGN PATENT DOCUMENTS

| | | | |
|---|---|---|---|
| JP | 0752834 | A | 2/1995 |
| JP | H0752834 | * | 2/1995 |

*Primary Examiner* — Brian L Swenson
(74) *Attorney, Agent, or Firm* — David B. Kelley; Brooks Kushman P.C.

(57) ABSTRACT

A system for cooling a traction battery includes a battery inlet housing having first and second inlets. A first duct is coupled to the first inlet, and a second duct is coupled to the second inlet. A flow guide vane is disposed within the battery inlet housing adjacent to the first inlet. The flow guide vane is positioned to redirect flow from the first duct to mix with flow from the second duct.

20 Claims, 6 Drawing Sheets

(56) References Cited

U.S. PATENT DOCUMENTS

| | | | |
|---|---|---|---|
| 2007/0175623 A1* | 8/2007 | Park ................... | H01M 10/625 |
| | | | 165/202 |
| 2009/0095449 A1* | 4/2009 | Bandai et al. ........... | 165/104.33 |
| 2009/0260905 A1* | 10/2009 | Shinmura ................... | 180/68.1 |
| 2011/0129716 A1* | 6/2011 | Chung et al. ................ | 429/120 |
| 2012/0009456 A1 | 1/2012 | Sohn | |
| 2013/0183564 A1* | 7/2013 | Wagner .............. | H01M 2/1077 |
| | | | 429/120 |
| 2014/0194049 A1* | 7/2014 | Kumagai et al. ............ | 454/143 |

* cited by examiner

HIGH VOLTAGE BATTERY COOLING PLENUM

TECHNICAL FIELD

The present disclosure relates to an inlet plenum for a high voltage battery cooling system.

BACKGROUND

Battery electric vehicles make use of an electric drive motor for propulsion, and hybrid electric vehicles make use of an electric drive motor in conjunction with a conventional internal combustion engine for propulsion. Such vehicles include a battery pack including one or more cells electrically connected together. These cells store energy that may be used to supply electric power to the drive motor. The battery pack may also be referred to as a traction battery or a high voltage battery. The traction battery and associated components may generate substantial amounts of heat. This heat may interfere with proper functioning of the battery pack if not dissipated, and so a cooling system is desirable to maintain satisfactory battery operating temperatures. Such a cooling system must satisfy a variety of design considerations including cooling effectiveness and compact packaging, and minimally affect the performance of other vehicle systems.

SUMMARY

A system for cooling a traction battery includes a battery inlet housing having first and second inlets. A first duct is coupled to the first inlet, and a second duct is coupled to the second inlet. A flow guide vane is disposed within the battery inlet housing adjacent to the first inlet. The flow guide vane is positioned to redirect flow from the first duct to mix with flow from the second duct.

An embodiment of the traction battery cooling system includes a second flow guide vane disposed adjacent the first flow guide and similarly positioned to redirect flow from the first duct. The flows from the first and second ducts may be asymmetric. In some embodiments, the height of the flow guide vane is less than the height of the battery inlet housing. In an exemplary embodiment, the ratio of flow guide vane height to battery inlet housing height is approximately 3:4.

An embodiment of the traction battery system further includes a battery pack housing in fluid communication with the battery inlet housing. In some embodiments, a battery pack may be retained within the battery housing. In some such embodiments, the battery pack comprises a plurality of cooling passages to direct air flow through the battery pack. In such embodiments, the flow guide vane is positioned to redirect the flow from the first duct to mix with the flow from the second duct to direct a substantially consistent flow volume among the plurality of cooling passages. In some embodiments, the fraction battery cooling system further includes an exhaust duct in fluid communication with the battery pack housing and an induction fan disposed within the exhaust duct. In some embodiments, the traction battery cooling system further includes a fan control system disposed within the battery pack housing.

In some embodiments, the first duct opens to a first vehicle C pillar and the second duct opens to a second vehicle C pillar. In other embodiments, the first duct joins the second duct to form a combined duct. The combined duct may open to a duct inlet at a central location aft of a vehicle rear seat.

An embodiment of a hybrid electric vehicle according to the present disclosure includes a vehicle frame. The vehicle frame has first and second support pillars at an aft cabin position. The hybrid electric vehicle further includes a battery housing assembly with first and second housing inlets and a flow guide vane positioned within the housing assembly proximate the first housing inlet. The hybrid electric vehicle further includes a first duct coupled to the first housing inlet and a second duct coupled to the second housing inlet. The first duct extends through a portion of the first pillar and has a first duct inlet in the first pillar, and the second duct extends through a portion of the second pillar and has a second duct inlet in the second pillar.

In some embodiments, the flow guide vane is positioned to direct the flow from the first housing inlet to mix smoothly with the flow from the second housing inlet. In some such embodiments, the flow from the first housing inlet is less than the flow from the second housing inlet. In some embodiments, the hybrid electric vehicle further includes a battery pack retained within the battery housing assembly. In such embodiments, the battery pack has a plurality of cooling passages, and the flow guide vane is positioned to direct the flows to mix and direct a balanced flow volume among the plurality of cooling passages. In some embodiments, the vehicle further includes an induction fan in fluid communication with the battery housing assembly to draw flow through the first and second ducts.

A method for cooling a traction battery of a vehicle includes directing air from a vehicle cabin through first and second inlets of a traction battery housing. The air is directed past at least one guide vane positioned to direct air from the first inlet to mix with air from the second inlet. The amount of air directed through the first inlet may differ from the amount of air directed through the second inlet. The method may additionally include drawing the mixed air across a plurality of traction battery passages. The amount of air drawn across each passage is substantially equal.

Embodiments according to the present disclosure provide a number of advantages. For example, the present disclosure provides a system for cooling a traction battery in which cabin air is drawn through two inlets and mixed smoothly to ensure cooling flow across all battery cells. In addition, systems and methods according to the present disclosure yield smooth air mixing in a battery housing, thereby reducing noise, vibration, and harshness. The present disclosure provides a system wherein cooling air is drawn from an aft region in a vehicle cabin, such that climate controlled cabin air may be used for cooling without negatively impacting occupant satisfaction with the climate control.

The above advantages and other advantages and features of the present disclosure will be readily apparent from the following detailed description of the preferred embodiments when taken in connection with the accompanying drawings.

DETAILED DESCRIPTION

As those of ordinary skill in the art will understand, various features of the present invention as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Uniform cooling of cells within an automotive battery system may improve battery performance and reduce cooling fan power requirements. As the number of cells in an array increases, however, providing uniform air flow throughout the stack becomes increasingly difficult. This may be especially true when vehicle packaging requirements limit inlet plenum volume, which can promote noticeable pressure differences therein. Such pressure differences may result in significant variations in air velocities around cells at different locations in the stack. Reduced air flow around some cells may result in lower current densities, degraded performance, etc.

To maintain a consistent cooling effect across a range of operating conditions, it may be undesirable to draw air from the exterior of the vehicle for battery cooling purposes. Temperature variations between cold and hot days across a variety of climates may lead to ambient air having unpredictable and inconsistent cooling capabilities. Consequently, it may be preferable to draw cooling air from the vehicle cabin instead. Cabin climate control systems maintain a more consistent internal temperature, and thus this air may be used as a more predictable coolant. However, if cabin air is to be used for cooling, it should be drawn into the cooler in such a way as to have a minimal effect on the cabin climate control system. A battery cooling system design must thus consider both the cooling effect on the battery and any noticeable effects on the climate control inside the vehicle cabin, in addition to being packaged efficiently within the vehicle.

Figure 1:
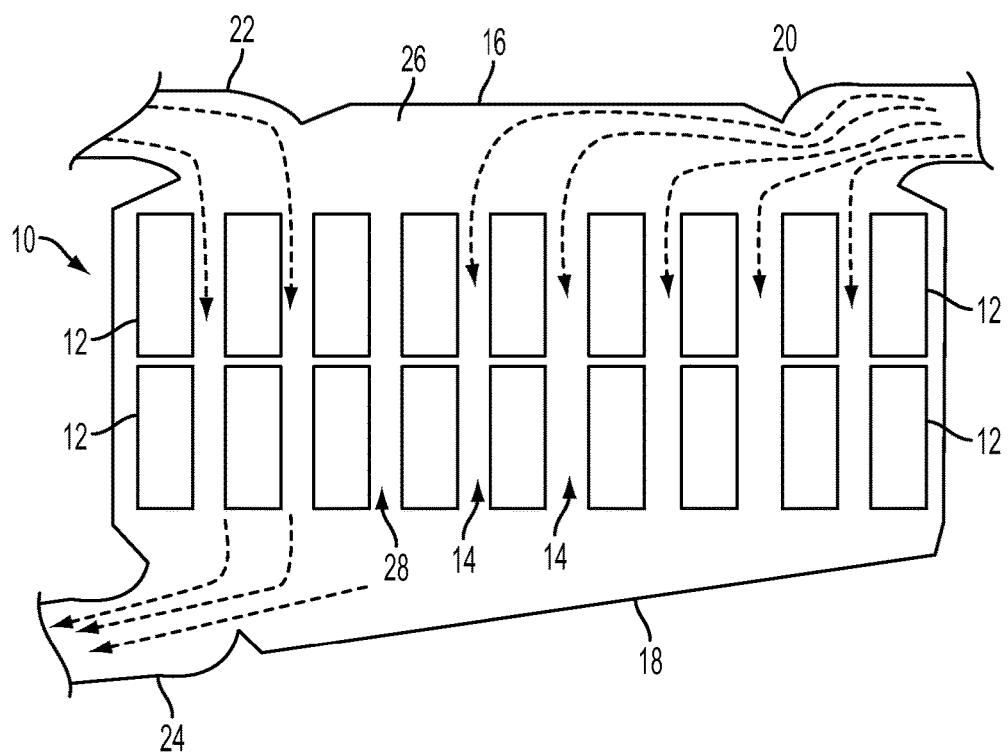
FIG. 1 is a diagrammatic representation of a traction battery cooling system.

Referring now to FIG. 1, a diagrammatic view of a housing 10 for a high voltage battery pack including a plurality of battery cells 12 is shown. The battery cells 12 are arrayed in two rows, the cells of each row being equally spaced apart. The battery cells 12 are separated by passages 14 of generally equal size. The housing includes an inlet plenum 16 and an outlet plenum 18. Inlet plenum 16 includes a first inlet 20 and a second inlet 22, each inlet in fluid communication with a source of air. Outlet plenum 18 includes an outlet 24. Outlet plenum 18 tapers from a narrow end to a broad end proximate outlet 24 to develop a more even air flow and pressure profile across the passages 14.

Air, represented by the dotted arrows, generally enters inlet plenum 16 through first inlet 20 and second inlet 22. The air may be propelled or impelled, for example, by a fan or blower [not illustrated]. The air flows through passages 14 and draws heat away from battery cells 12. The air then exits passages 14 into outlet plenum 18 and is drawn through outlet 24. A bypass passage [not illustrated] may be provided from the inlet plenum 16 around the first row of battery cells 12 to ensure that the second row of battery cells 12 receives a quantity of non-preheated air.

This configuration, including a first inlet 20 and a second inlet 22, generally promotes a more even air flow velocity among the passages 14 relative to a single inlet configuration. However, uneven air flow may still develop if the air flow from inlet 22 does not mix smoothly with air flow from inlet 20. In such regions, illustrated at numeral 26, the air velocity may decrease. A passage 28 that is proximate such a low air velocity region may receive insufficient cooling flow to adequately draw heat away from the associated battery cells 12. This may lead to a buildup of heat in the affected battery cells 12, which may negatively impact performance. Furthermore, the turbulent flow from the unsmooth mixing may cause noise, vibration, and harshness.

To ensure adequate cooling among all passages 14, a speed of the fan or blower may be increased to account for the reduced cooling experienced by the cells 12 proximate low velocity region 26. Increases in power consumption by a fan associated with increased speed may be undesirable, however.

Figure 2:
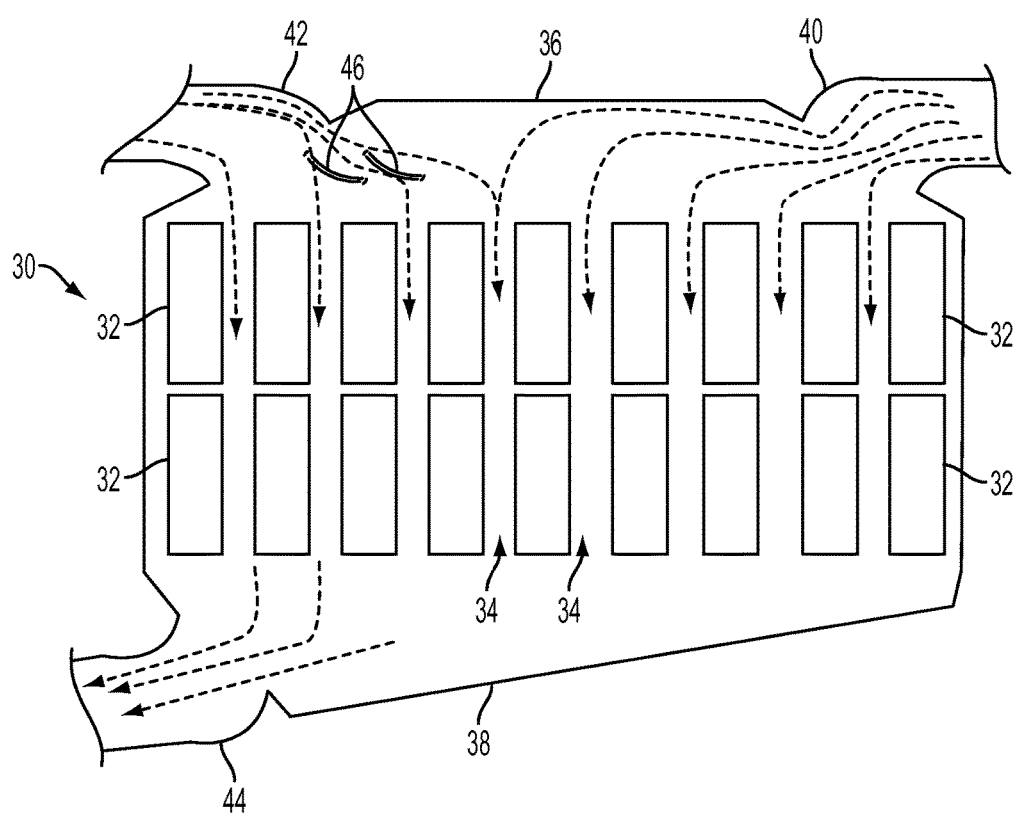
FIG. 2 is a diagrammatic representation of a battery pack housing of a traction battery cooling system.

Referring now to FIG. 2, a diagrammatic representation of housing 30 for a traction battery pack including a plurality of battery cells 32 is shown. The battery cells 32 are separated by passages 34. The housing includes an inlet plenum 36 and an outlet plenum 38. Inlet plenum 36 includes a first inlet 40 and a second inlet 42. Outlet plenum 38 includes an outlet 44.

Inlet plenum 36 additionally includes at least one guide vane 46. In an exemplary embodiment, inlet plenum 36 includes two guide vanes 46. Inlet plenum 36 has a height a [not illustrated] and guide vane 46 has a height b [not illustrated]. Guide vane height b may be less than or equal to height a. In an exemplary embodiment, the ratio of guide vane height b to inlet plenum height a is approximately 3:4. Such a configuration ensures that air flow may be redirected without incurring a substantial reduction in flow capacity or increase in pressure. As an example, one such configuration increases pressure less than 1 Pascal and decreases airflow less than 0.5 cubic feet per minute. In other embodiments, a different ratio may be preferable for optimum flow characteristics, as may be determined by computational fluid dynamics (CFD) or other design tools.

Air, represented by the dotted arrows, enters inlet plenum 36 through first inlet 40 and second inlet 42. The air may be propelled or impelled, for example, by a fan [not illustrated]. The air flows through passages 34 and draws heat away from battery cells 32. The air then exits passages 34 into outlet plenum 38 and is drawn through outlet 44. A bypass passage [not illustrated] may be provided from the inlet plenum 36 around the first row of battery cells 32 to ensure that the second row of battery cells 32 receives cooler air.

Guide vanes 46 are configured to direct air from inlet 42 to smoothly mix with air from inlet 40. Consequently low velocity regions are reduced or eliminated, and the flow among passages 34 is substantially even. Thus heat is drawn away from battery cells 32 evenly, improving battery performance. In addition, the reduction in turbulence of the mixed flows leads to a reduction in noise, vibration, and harshness.

The volume rate of air flow from inlet 42 may differ substantially from the volume rate of air flow from inlet 40. Guide vanes 46 are designed to accommodate such asymmetric flows and ensure smooth flow mixing across a range of operating conditions.

Figure 3:
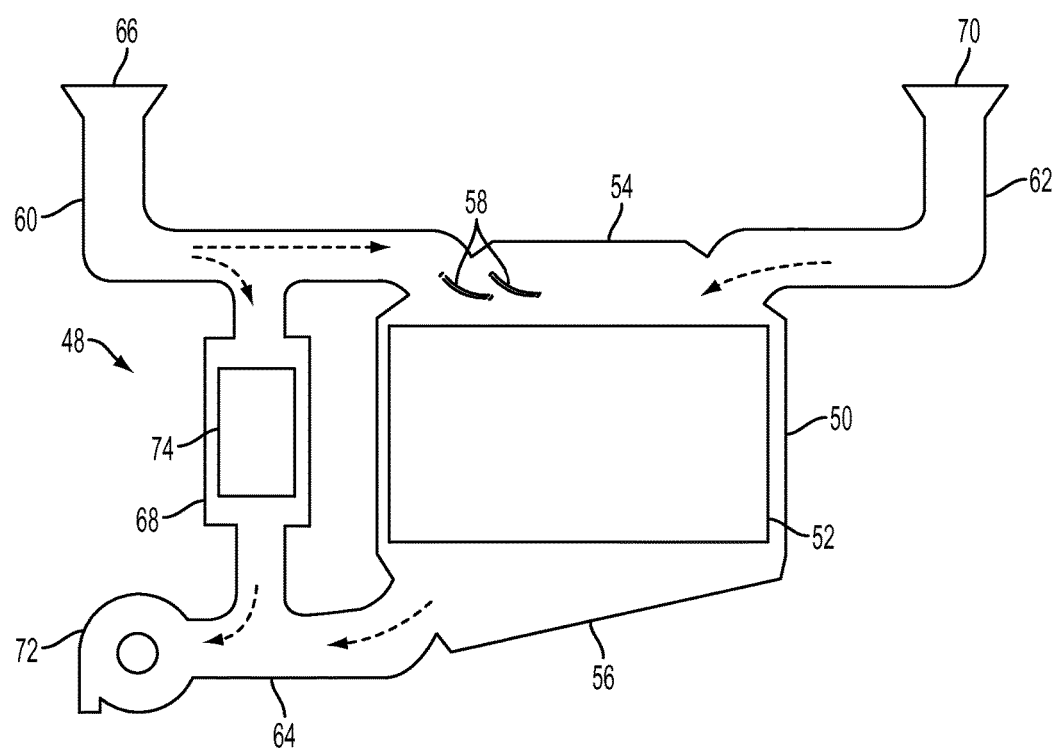
FIGS. 3 and 4 are schematic representations of traction battery cooling systems including the housing of FIG. 2.

Referring now to FIG. 3, a schematic representation of an embodiment of a traction battery cooling system 48 is shown. High voltage battery cooling system 48 includes a battery housing 50 that is substantially the same as battery housing 30 shown in FIG. 2. Battery housing 50 includes a battery array 52, inlet plenum 54, outlet plenum 56, and at least one guide vane 58. Battery 52 may include a plurality of battery cells [not illustrated] as shown in FIG. 2.

High voltage battery cooling system 48 includes a first duct 60, a second duct 62, and a third duct 64. First duct 60 has a first duct inlet 66, and connects to a control module housing 68 and to inlet plenum 54. Second duct 62 has a second duct inlet 70 and connects to inlet plenum 54. First duct inlet 66 and second duct inlet 70 are in fluid communication with a source of air. Third duct 64 connects to outlet plenum 56 and to an induction fan 72.

Control module housing 68 includes battery control system 74. Battery control system 74 includes components and controllers that monitor and control the battery system. Battery control system 74 may further include components that perform other functions, including but not limited to voltage converters and controls for induction fan 72 and the rest of battery cooling system 48. Battery control system 74 generates waste heat, which may be drawn away to avoid a negative impact on performance. Control module housing 68 may also include various other heat components, including a battery voltage converter [not illustrated]. These other components may also produce heat which may adversely affect performance.

Air, represented by the dotted arrows, is drawn by induction fan 72 into first duct 60 through first duct inlet 66 and into second duct 62 through second duct inlet 70. A portion of the air in duct 60 is diverted into control module housing 68, and the remainder of the cooling flow in duct 60 is drawn into inlet plenum 54. In an exemplary embodiment, approximately 60% of the air in duct 60 is diverted into control module housing 68 and 40% of the air in duct 60 is drawn into inlet plenum 54. Consequently, a greater volume of air may enter inlet plenum 54 from second duct 62 than from first duct 60. Guide vanes 58 are therefore designed to accommodate and ensure smooth mixing of asymmetric flow volumes from first duct 60 and second duct 62.

The air that is drawn into control module housing 68 draws heat away from battery control system 74 and other components retained within battery control module housing 68. The air is then drawn into third duct 64 and into induction fan 72. Induction fan 72 is in fluid communication with an air exhaust region, such as an exterior of a vehicle.

The air that is drawn from first duct 60 into inlet plenum 54 is directed by guide vanes 58 to mix with the air drawn from second duct 62, in substantially the same fashion as illustrated in FIG. 2. The air flows through and draws heat away from battery 52. The air is then drawn through outlet plenum 56 into third duct 64 and into induction fan 72.

Figure 4:
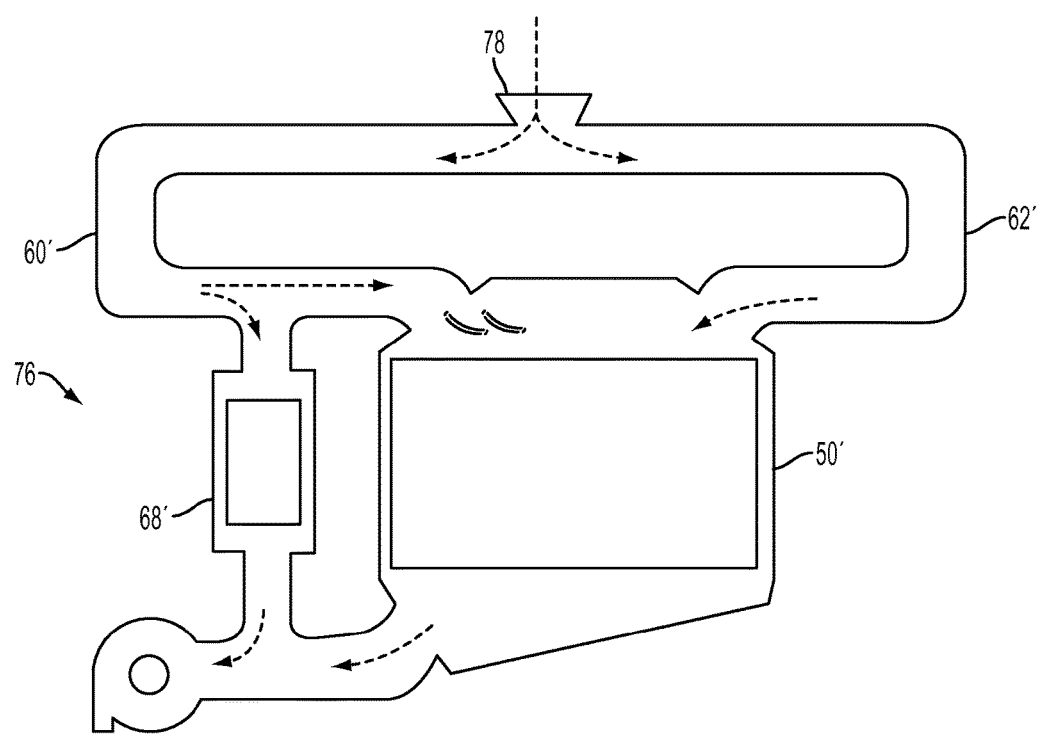

Referring now to FIG. 4, a schematic representation of an alternative embodiment of a high voltage battery cooling system 76 is shown. In this embodiment, a single duct inlet 78 leads to first duct 60' and second duct 62'. Duct inlet 78 may draw air from, for example, a central location behind a rear seat. In one embodiment, duct inlet 78 opens to the cabin side of a dividing panel or package tray separating the vehicle cabin and vehicle trunk. First duct 60' and second duct 62' are in fluid communication with control module housing 68' and/or battery housing 50' in substantially the same manner as described in conjunction with FIG. 3.

Figure 5:
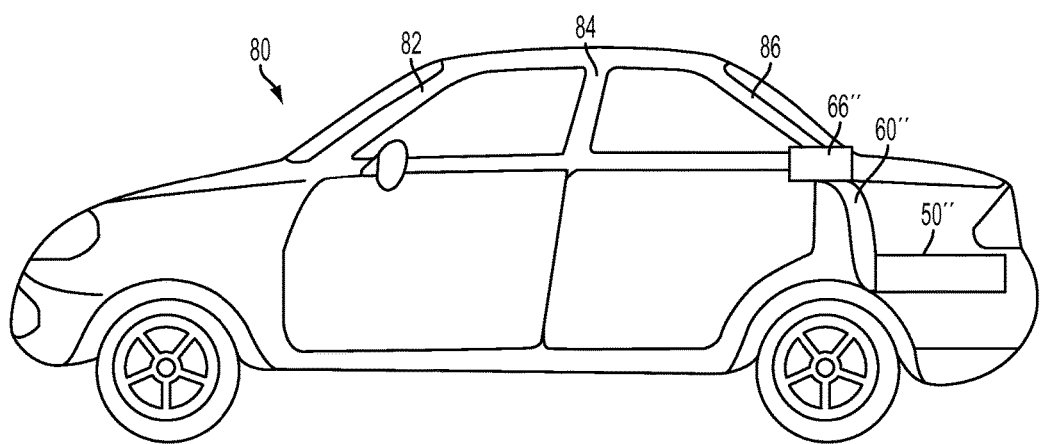
FIG. 5 is a diagrammatic representation of a vehicle including the traction battery cooling system of FIG. 3.

Referring now to FIG. 5, a diagrammatic representation of a vehicle 80 according to an embodiment of the present disclosure is shown. Vehicle 80 includes a high voltage battery cooling system substantially as illustrated in FIG. 3, including first duct 60", first duct inlet 66", and battery housing 50" in fluid communication with duct 60". The high voltage battery cooling system further includes a second duct and second duct inlet not illustrated in this view. Vehicle 80 also includes a vehicle roof [not numbered] and a plurality of pillars supporting the vehicle roof According to convention, the pillars are labeled alphabetically from the front to rear of the vehicle. The A pillar 82 is at the fore of the passenger cabin, the B pillar 84 is mid-cabin, and the C pillar 86 is at the aft of the passenger cabin.

First duct inlet 66" is located in the passenger cabin proximate C pillar 86. The second duct inlet is similarly located proximate the C pillar on the opposite side of the vehicle [not shown in this view]. In this fashion, the air flowing into the battery cooling system is cabin air, which is generally maintained at more consistent temperatures than ambient air. In addition, by drawing air from the aft of the cabin, climate control is left generally unaffected, increasing customer satisfaction. Battery housing 50" may be stored beneath the vehicle trunk.

Figure 6:
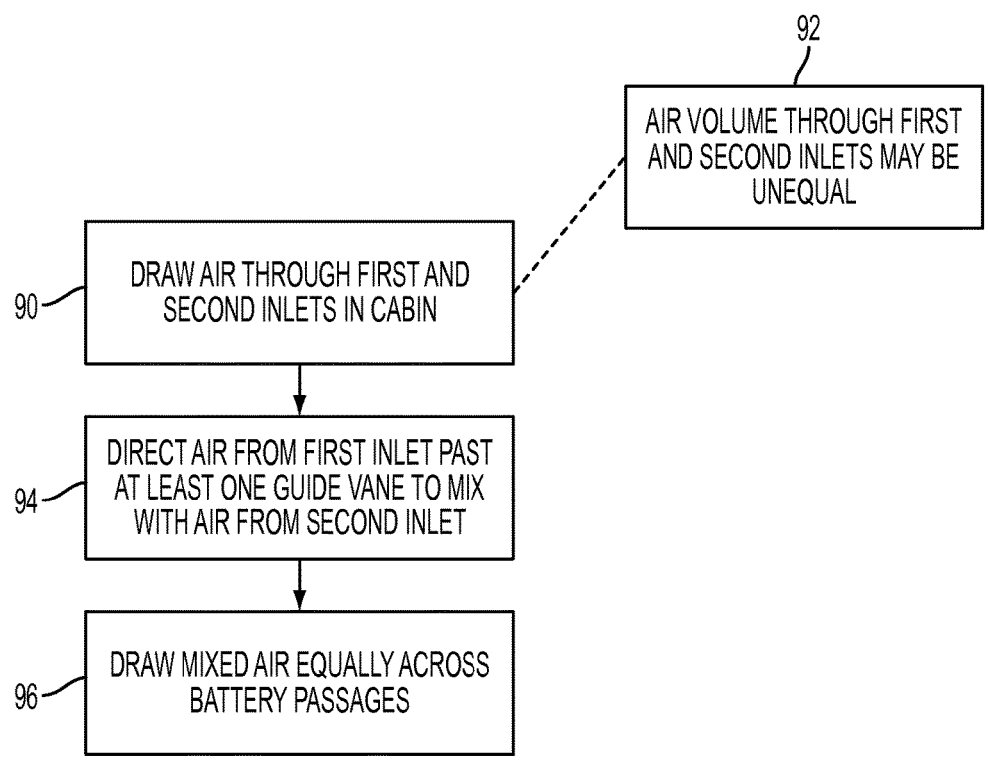
FIG. 6 is a flowchart of a method for cooling a traction battery.

Referring now to FIG. 6, a flowchart of a method is illustrated. Air is drawn through first and second inlets in a vehicle cabin, as illustrated in block 90. The air volume through the first and second inlets may be unequal, as illustrated in block 92. Air is then directed from the first inlet past at least one guide vane to mix with air from the second inlet, as illustrated in block 94. The mixed air is then drawn across the battery passages such that the amount of air through each passage is substantially equal, as illustrated in block 96.

As can be seen from the various embodiments, the present disclosure provides a system for cooling a high voltage battery in which cabin air is drawn through two inlets and mixed smoothly to ensure cooling flow across all battery cells. In addition, systems and methods according to the present disclosure yield smooth air mixing in a battery housing—reducing noise, vibration, and harshness. The present disclosure provides a system wherein cooling air is drawn from an aft region in a vehicle cabin, such that climate controlled cabin air may be used for cooling without negatively impacting occupant satisfaction with the climate control.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A traction battery cooling system comprising:
   a battery inlet housing having first and second inlets spaced from one another;
   a first duct coupled to the first inlet;
   a second duct coupled to the second inlet; and
   a flow guide vane comprising an airfoil disposed within the battery inlet housing adjacent to the first inlet and positioned to redirect a first flow from the first duct to mix with a second flow from the second duct.

2. The traction battery cooling system of claim 1 further comprising a second airfoil disposed adjacent the airfoil and positioned to redirect the first flow from the first duct to mix with the second flow from the second duct.

3. The traction battery cooling system of claim 1, wherein the battery inlet housing is configured to accommodate asymmetric first and second flows.

4. The traction battery cooling system of claim 1, wherein a height of the flow guide vane is less than a height of the battery inlet housing.

5. The traction battery cooling system of claim 1, wherein a ratio of flow guide vane height to battery inlet housing height is approximately 3:4.

6. The traction battery cooling system of claim 1 further comprising a battery pack housing in fluid communication with the battery inlet housing.

7. The traction battery cooling system of claim 6 further comprising a battery pack retained within the battery pack housing.

8. The traction battery cooling system of claim 7, wherein the battery pack includes a plurality of cooling passages to direct air flow through the battery pack and wherein the flow guide vane is positioned to redirect the first flow to mix with the second flow to direct a substantially equal flow volume among the plurality of cooling passages.

9. The traction battery cooling system of claim 6 further comprising an exhaust duct in fluid communication with the battery pack housing and an induction fan disposed within the exhaust duct.

10. The traction battery cooling system of claim 9 further comprising a battery control system disposed within a control system housing, wherein the control system housing is in fluid communication with the first duct and the exhaust duct.

11. The traction battery cooling system of claim 1, wherein the first duct opens to a vehicle cabin from a first vehicle C pillar and the second duct opens to the cabin from a second vehicle C pillar.

12. The traction battery cooling system of claim 1, wherein the first duct joins the second duct to form a combined duct.

13. The traction battery cooling system of claim 1, wherein the first duct has a first duct inlet and is configured to direct the first flow in a downstream direction, and wherein the flow guide vane is disposed in the downstream direction from the first inlet.

14. A hybrid electric vehicle comprising:
a vehicle frame having first and second support pillars at an aft cabin position;
a battery housing having an inlet plenum portion, the battery housing further having first and second housing inlets arranged in the inlet plenum portion and a flow guide vane positioned within the inlet plenum portion proximate the first housing inlet;
a first duct coupled to the first housing inlet, the first duct extending through a portion of the first pillar and having a first duct inlet in the first pillar; and
a second duct coupled to the second housing inlet, the second duct extending through a portion of the second pillar and having a second duct inlet in the second pillar.

15. The hybrid electric vehicle of claim 14, wherein the flow guide vane is positioned to direct a first flow from the first housing inlet to mix with a second flow from the second housing inlet.

16. The hybrid electric vehicle of claim 15, wherein the first flow is less than the second flow.

17. The hybrid electric vehicle of claim 15 further comprising a battery pack retained within the battery housing and having a plurality of cooling passages, wherein the flow guide vane is positioned to direct the first flow to mix with the second flow to direct a balanced flow volume among the plurality of cooling passages.

18. The hybrid electric vehicle of claim 14 further comprising an induction fan in fluid communication with the battery housing and configured to draw flow through the first duct and second duct.

19. The hybrid electric vehicle of claim 14, wherein the flow guide vane comprises an airfoil.

20. The hybrid electric vehicle of claim 14, wherein the flow guide vane is positioned in a downstream direction from the first housing inlet.

* * * * *